(12) United States Patent
Sawayanagi

(10) Patent No.: US 8,905,612 B2
(45) Date of Patent: Dec. 9, 2014

(54) LIGHTING STRUCTURE OF CHARGING CONNECTOR

(75) Inventor: Masahiro Sawayanagi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/404,120

(22) Filed: Feb. 24, 2012

(65) Prior Publication Data

US 2012/0218779 A1   Aug. 30, 2012

(30) Foreign Application Priority Data

Feb. 25, 2011   (JP) ................. 2011-039248

(51) Int. Cl.
*F21V 7/04* (2006.01)
*H01R 13/717* (2006.01)
*B60L 11/18* (2006.01)

(52) U.S. Cl.
CPC ........ *H01R 13/7172* (2013.01); *B60L 11/1818* (2013.01); *H01R 2201/26* (2013.01); *Y02T 10/7088* (2013.01); *Y02T 10/7005* (2013.01); *Y02T 90/121* (2013.01); *Y02T 90/14* (2013.01)
USPC ............ 362/606; 362/607; 362/231; 362/611

(58) Field of Classification Search
USPC .......... 362/362, 231, 235, 606, 607, 611, 84; 349/62, 63, 65
See application file for complete search history.

(56) References Cited

U.S. PATENT DOCUMENTS

| 2006/0188836 | A1* | 8/2006 | Logan et al. ............... 433/29 |
| 2009/0187077 | A1* | 7/2009 | Hosoda et al. ............. 600/178 |
| 2010/0159317 | A1 | 6/2010 | Taghikhani et al. |
| 2010/0217102 | A1* | 8/2010 | Leboeuf et al. ............. 600/310 |
| 2010/0246198 | A1 | 9/2010 | Hook et al. |
| 2010/0302781 | A1 | 12/2010 | Markyvech et al. |
| 2011/0043355 | A1 | 2/2011 | Chander et al. |
| 2012/0140450 | A1* | 6/2012 | Motyka et al. ............. 362/102 |

FOREIGN PATENT DOCUMENTS

| CN | 101848822 A | 9/2010 |
| DE | 29519101 U1 | 2/1996 |
| DE | 20204423 U1 | 7/2002 |
| DE | 102006017915 B3 | 8/2007 |

(Continued)

OTHER PUBLICATIONS

Communication dated Oct. 16, 2013 from the German Patent and Trademark Office in a counterpart application No. 10 2012 101 491.4.

(Continued)

*Primary Examiner* — Anh Mai
*Assistant Examiner* — Kevin Quarterman
(74) *Attorney, Agent, or Firm* — Sughrue Mion, PLLC

(57) ABSTRACT

A lighting unit 5 includes a lighting functional portion 7 and a light guide member 8. The lighting functional portion 7 includes a light source 9 and a light-transmissive housing 11. The light source 9 is constituted by a plurality of types of LEDs with different emission colors. The light guide member 8 is molded using a synthetic resin material having light permeability. The light guide member 8 has a light incidence portion 13, a light-emitting portion 14 provided at a charging port 3 of a housing 2, and an intermediate portion 15 that connects the light incidence portion 13 and the light-emitting portion 14 together. If the light-emitting portion 14 emits light with the guided light, the light-emitting portion can be caused to look like shining the charging port 3 of the housing 2.

3 Claims, 4 Drawing Sheets

(56) References Cited

FOREIGN PATENT DOCUMENTS

| | | |
|---|---|---|
| DE | 102010021587 A1 | 1/2011 |
| EP | 1351340 A1 | 10/2003 |
| EP | 1544955 A2 | 6/2005 |
| EP | 1848070 A1 | 10/2007 |
| JP | 2010-165596 A | 7/2010 |

OTHER PUBLICATIONS

Office Action, dated Apr. 28, 2013, issued by the State Intellectual Property Office of P.R. China in counterpart Chinese Patent Application No. 201210047033.2.

* cited by examiner

LIGHTING STRUCTURE OF CHARGING CONNECTOR

BACKGROUND OF THE INVENTION

1. Field of the Invention

The present invention relates to a lighting structure of a charging connector.

2. Description of the Related Art

In an electric automobile or a hybrid automobile, a charging connector constituted by a power-supply-side connector and a power-receiving-side connector (vehicle-side inlet) is used for charging of a battery.

A technique regarding the charging connector is disclosed in the following Patent Document 1. According to this disclosed technique, the power-receiving-side connector is provided in a power-receiving-side accommodating chamber in the vehicle. The power-supply-side connector that is coupled to or decoupled from the power-receiving-side connector has a light-emitting portion in order to facilitate an operation at night.

Patent Document 1: JP-A-2010-16559

By the way, in the above related art, when the power-supply-side connector is coupled with the charging port of the power-receiving-side connector, the operation of causing the light-emitting portion of the power-supply-side connector to emit light so as to search for the charging port of the power-receiving-side connector is required. This operation is an experiencing operation, and there is a problem in that it is difficult that anyone can simply perform the coupling operation at night or in a dark place.

SUMMARY OF THE INVENTION

The invention has been made in view of the above circumstances, and an object thereof is to provide a lighting structure that enables anyone to simply perform the coupling operation of a charging connector at night or in a dark place.

In order to solve the above problems, a lighting structure of a charging connector of the invention set forth in a first aspect includes a light source, and a light guide member that guides light from the light source. A light-emitting portion of the light guide member is provided at a charging port of a housing of a power-receiving-side connector of a charging connector including a power-supply-side connector and the power-receiving-side connector.

According to the invention having such a feature, the light-emitting portion of the light guide member is provided at the charging port of the housing of the power-receiving-side connector so as to cause the light-emitting portion to shine.

A lighting structure of a charging connector of an invention set forth in second aspect is the lighting structure of a charging connector of the invention set forth in the first aspect in which the light-emitting portion is provided with a light storage functional portion.

According to the invention having such a feature, light storage functional portion causes the light-emitting portion to continue shining even in a case where the light from the light source is interrupted.

A lighting structure of a charging connector of an invention set forth in a third aspect is the lighting structure of a charging connector of the invention set forth in the first or second aspect in which a light-transmissive housing is provided to cover the light source, and the light guide member is formed integrally with the light-transmissive housing.

According to the invention having such a feature, a boundary portion between the light-transmissive housing and the light guide member is eliminated.

A lighting structure of a charging connector of an invention set forth in a fourth aspect is the lighting structure of a charging connector of the invention set forth in any one of the first to third aspects, further including a plurality of types of the light sources with different emission colors.

According to the invention having such a feature, emission colors are changed so as to cause the light-emitting portion to shine.

According to the invention set forth in the first aspect, an effect is exhibited that the light-emitting portion of the light guide member can be caused to emit light so as to shine the charging port of the housing. Thereby, an effect is exhibited that an operator can visually recognize the position of the charging port of the housing easily and reliably. Accordingly, an effect is exhibited that anyone can simply perform the coupling operation of the charging connector.

According to the invention set forth in the second aspect, an effect is exhibited that the light-emitting portion can be caused to look like shining the charging port of the housing even in a case where the light from the light source is interrupted by, for example, a timer or the like.

According to the invention set forth in the third aspect, an effect is exhibited that the light from the light source can be efficiently guided up to the light-emitting portion. Additionally, according to the invention, an effect is exhibited that the number of parts can be reduced by integration.

According to the invention set forth in the fourth aspect, an effect is exhibited that the status of, for example, error, charging in progress, or charging completion can be indicated by light emission in addition to the light emission when the power-supply-side connector is coupled.

BRIEF DESCRIPTION OF THE DRAWINGS

FIG. 1A is a plan view, FIG. 1B is a cross-sectional view of a first form, FIG. 1C is a cross-sectional view of a second form, and FIG. 1D is a cross-sectional view of a third form.

DESCRIPTION OF THE PREFERRED EMBODIMENTS

Figure 1:
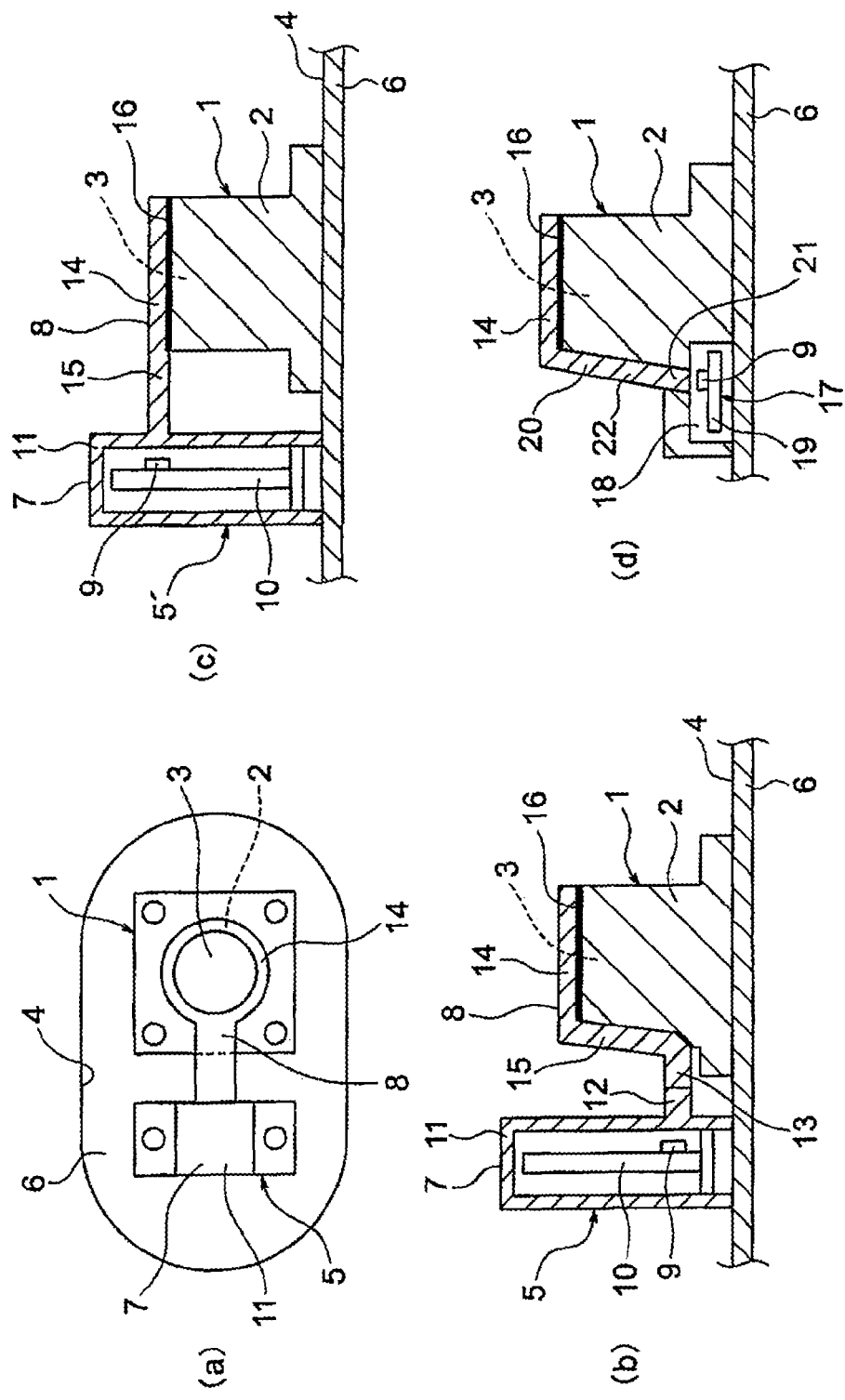
FIGS. 1A to 1D are schematic views showing a lighting structure of a charging connector related to the invention.

An embodiment will be described below, referring to FIGS. 1A to 1D. FIGS. 1A to 1D are schematic views showing a lighting structure of a charging connector related to the invention, FIG. 1A is a plan view, FIG. 1B is a cross-sectional view of a first form, FIG. 1C is a cross-sectional view of a second form, and FIG. 1D is a cross-sectional view of a third form.

In FIGS. 1A and 1B, the charging connector is constituted by a power-supply-side connector and a power-receiving-side connector (vehicle-side inlet) 1. The power-receiving-side connector 1 has a substantially tubular housing 2. The housing 2 is provided with a charging port 3. Such a power-receiving-side connector 1 is provided at a power-receiving-side accommodating chamber 4 in a vehicle. A lighting unit 5 is also provided in the power-receiving-side accommodating chamber 4. The lighting unit 5 is adapted to be turned on and off (this is an example), for example when an opening and closing lid (not shown) of the power-receiving-side accommodating chamber 4 is opened and closed or by a timer, or the like. The lighting unit 5 is provided in order to facilitate the coupling operation of the power-supply-side connector and the power-receiving-side connector 1 at night or in a dark place.

The lighting unit 5 includes a lighting functional portion 7 and a light guide member 8, as portions exposed from a bottom wall 6 of the power-receiving-side accommodating chamber 4. Additionally, the lighting unit 5 includes a harness portion (not shown) connected to the lighting functional portion 7, a connector provided at a terminal of the harness portion, and fixing means (for example, a well-known clip or the like) for appropriately fixing the harness portion, as portions hidden by the bottom wall 6.

The lighting functional portion 7 includes a timer board assembly 10 on which a light source 9 is mounted, and a light-transmissive housing 11 that covers the time board assembly 10. The light-transmissive housing 11 is provided with a housing fixed portion (no reference numeral) as a portion to be fixed to the bottom wall 6.

The light source 9 is constituted by a plurality of types of LEDs with different emission colors. In the present form, the light source is used not only to light the charging port 3 of the housing 2, but also to perform status indication, such as error indication, indication for charging in progress, or charging completion indication. In addition, the light source is not limited to the LEDs, and a well-known lamp may be used. The timer board assembly 10 has a predetermined circuit for causing the plurality of types of LEDs to emit light, a timer circuit, and the like.

The light-transmissive housing 11 is molded using a synthetic resin material having light permeability. The light-transmissive housing 11 is molded from resin so as to become transparent as a whole. Additionally, the light-transmissive housing 11 is formed so as to function as a light guide member that can guide light to a predetermined position. In such a light-transmissive housing 11, reference sign 12 represents a light guide portion. The light guide portion 12 is formed in a shape protruding from a side wall (this is an example). The light guide portion 12 is arranged and formed in accordance with the position of the light source 9. The light guide portion 12 is formed so as to be able to guide the light from the light source 9 to this protruding tip.

The light guide member 8 is molded from a synthetic resin material having light permeability. The light guide member 8 has a light incidence portion 13 that is continuous with the light guide portion 12, a light-emitting portion 14 at the charging port 3 of the housing 2, and an intermediate portion 15 that connects the light incidence portion 13 and the light-emitting portion 14 together. The light guide member 8 is formed so as to be able to guide the light incident on the light incidence portion 13 to the light-emitting portion 14 via the intermediate portion 15.

The light guide member 8 may be provided by being two-color molded with respect to the housing 2, or may be separately provided by afterward attachment.

If the light-emitting portion 14 emits light with the guided light, the light-emitting portion can be caused to look like shining the charging port 3 of the housing 2. Since the light-emitting portion 14 shines annularly, the time and efforts taken to search for the charging port 3 are eliminated, and anyone can simply perform the coupling operation of the power-supply-side connector and the power-receiving-side connector 1 at night or in a dark place.

The light-emitting portion 14 is provided with a light storage functional portion 16. The light storage functional portion 16 is provided as a portion that can cause the light-emitting portion 14 to continue shining, even in a case where the light from the light source 9 is interrupted. In addition, whether or not the light storage functional portion 16 is provided is arbitrary. A fluorescence functional portion may be provided if necessary in addition to the above light storage functional portion 16.

In the above configuration and structure, according to the lighting structure of the charging connector, an effect is exhibited that the light-emitting portion 14 of the light guide member 8 can be caused to emit light so as to look like shining the charging port 3 of the housing 2. Thereby, an effect is exhibited that an operator can visually recognize the position of the charging port 3 easily and reliably. Accordingly, an effect is exhibited that anyone can simply perform the coupling operation of the charging connector.

Additionally, according to the lighting structure of the above charging connector, since the light source 9 is constituted by a plurality of types of LEDs with different emission colors, an effect is exhibited that the status of, for example, error, charging in progress, or charging completion can be indicated by light emission (can also be indicated by simple color or RGB light emission or indicated by flashing or blinking) in addition to the light emission in the coupling operation.

In FIG. 1C, reference numeral 5' represents a lighting unit related to a second form. The lighting unit 5' is different from the lighting unit 5 of FIG. 1B only in that the position of the light source 9 is different and the light guide member 8 is integrated with the light-transmissive housing 11. The lighting unit 5' includes a lighting functional portion 7 with which the light guide member 8 is integrated, as a portion exposed from the bottom wall 6 of the power-receiving-side accommodating chamber 4 (the others are the same as those of the first form).

The light source 9 and the light guide member 8 are disposed in accordance with the height position of the charging port 3 of the housing 2.

The light guide member 8 is formed so as to extend straight toward the light-transmissive housing 11 from the charging port 3. The second form has no boundary portion since division is not made unlike the light guide portion 12 and the light incidence portion 13 of the first form (refer to FIG. 1B, and is formed in a shape that can efficiently guide the light from the light source 9.

In the above configuration and structure, according to the lighting structure including the lighting unit 5', similarly to the lighting structure of FIG. 1B, an effect is exhibited that anyone can simply perform the coupling operation of the charging connector. Additionally, an effect is exhibited that the status of error, charging in progress, or the like can also be indicated by light emission.

In FIG. 1D, reference numeral 17 represents a lighting unit related to a third form. The lighting unit 17 is integrated with the housing 2 of the power-receiving-side connector 1. The lighting unit 17 is configured as follows as a lighting functional portion 18. That is, the lighting unit includes a timer board assembly 19 built in the housing 2, and a light guide member 20. The light source 9 is mounted on the timer board assembly 19.

The light guide member 20 is molded using a synthetic resin material having light permeability. The light guide member 20 has the light-emitting portion 14 provided at the charging port 3 of the housing 2, and a light incidence portion 21 and a intermediate portion 22 that guide the light from the light source 9 to the light-emitting portion 14. The light incidence portion 21 and the intermediate portion 22 are formed so as to be arranged along the outer peripheral surface of the housing 2.

In the above configuration and structure, according to the lighting structure including the lighting unit 17, similarly to the lighting structure of FIGS. 1B and 1C, an effect is exhibited that anyone can simply perform the coupling operation of the charging connector. Additionally, an effect is exhibited that the status of error, charging in progress, or the like can also be indicated by light emission.

EXAMPLES

Figure 2:
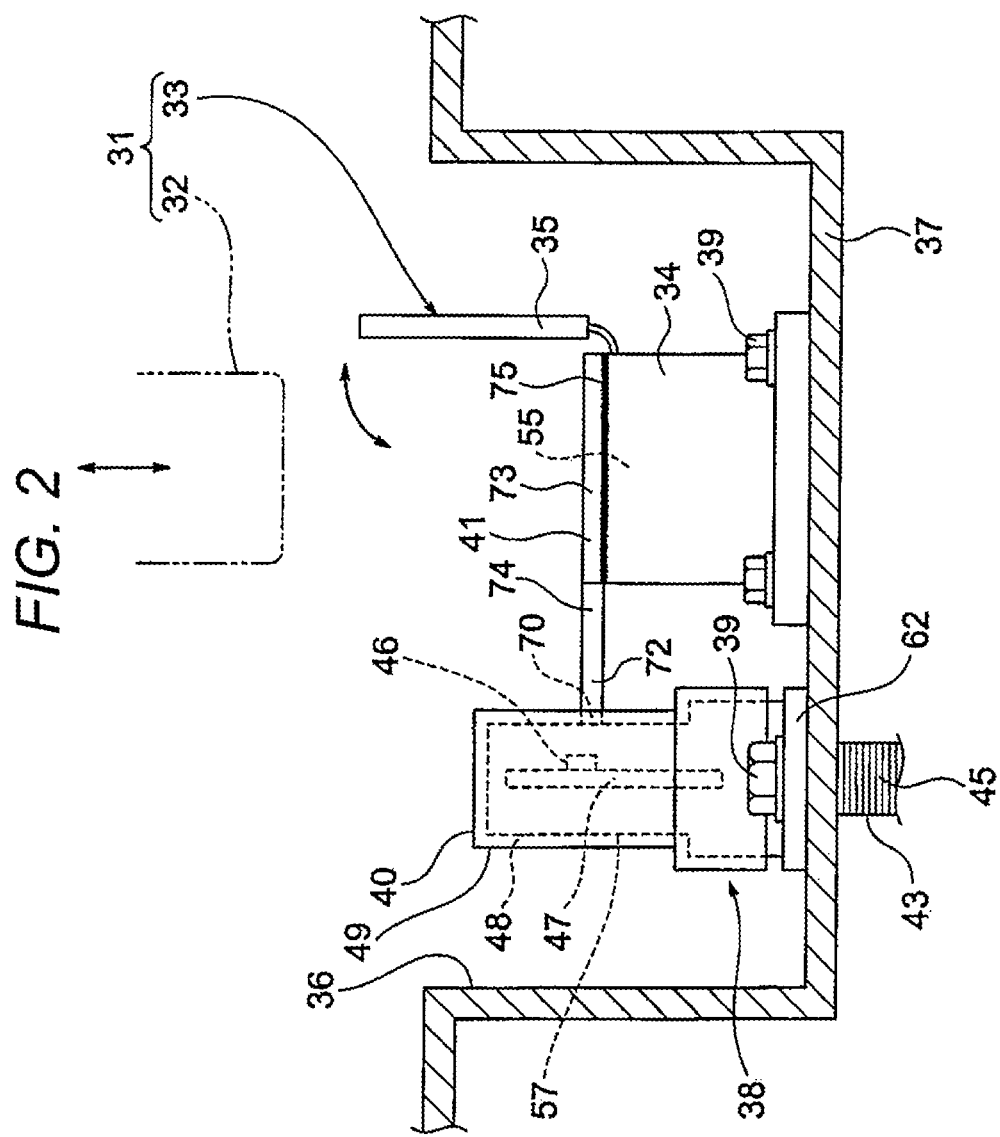
FIG. 2 is an arrangement view of a power-receiving-side accommodating chamber showing the lighting structure of the charging connector related to the invention (Example).
Figure 3:
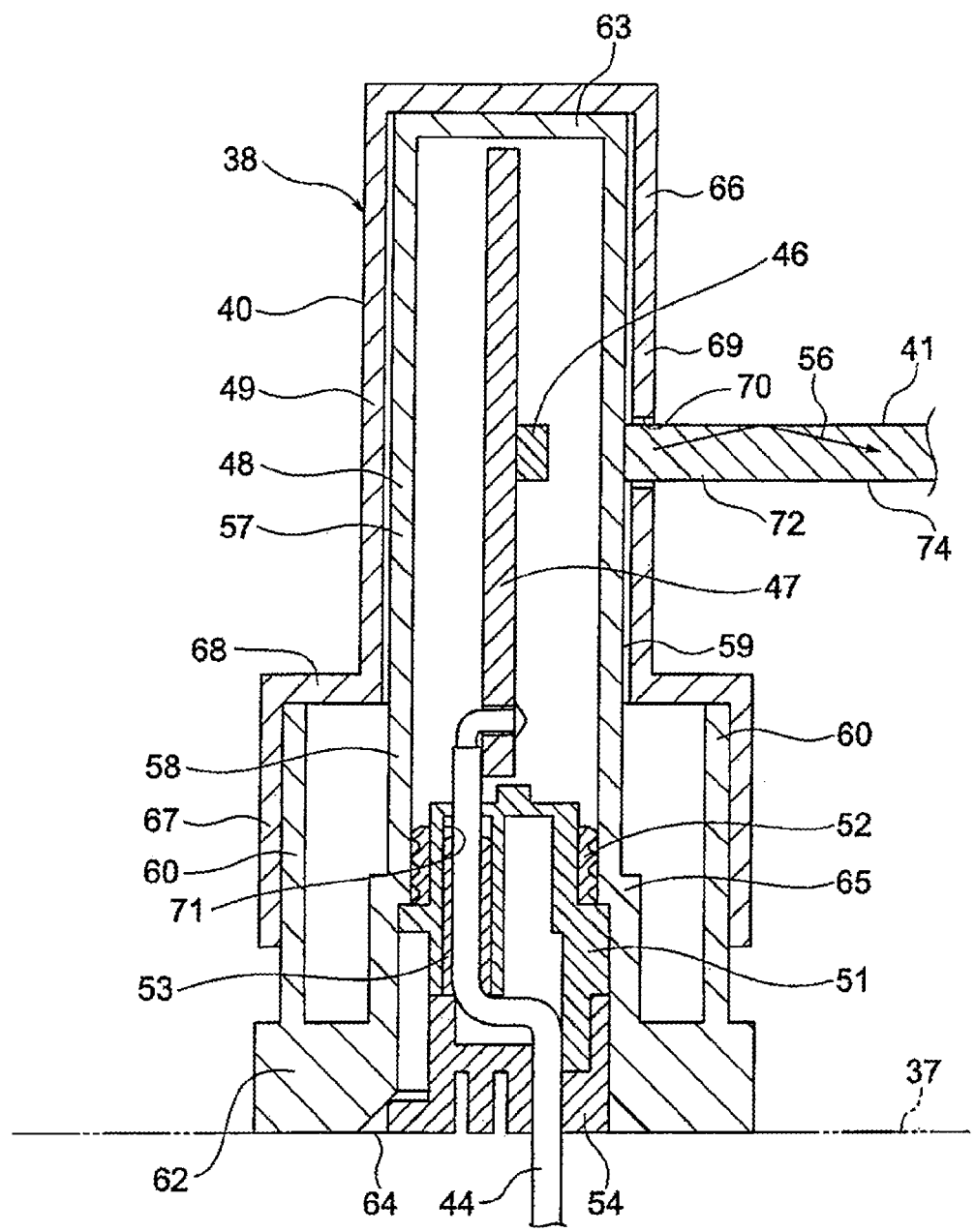
FIG. 3 is a cross-sectional view of chief portions of a lighting unit.
Figure 4:
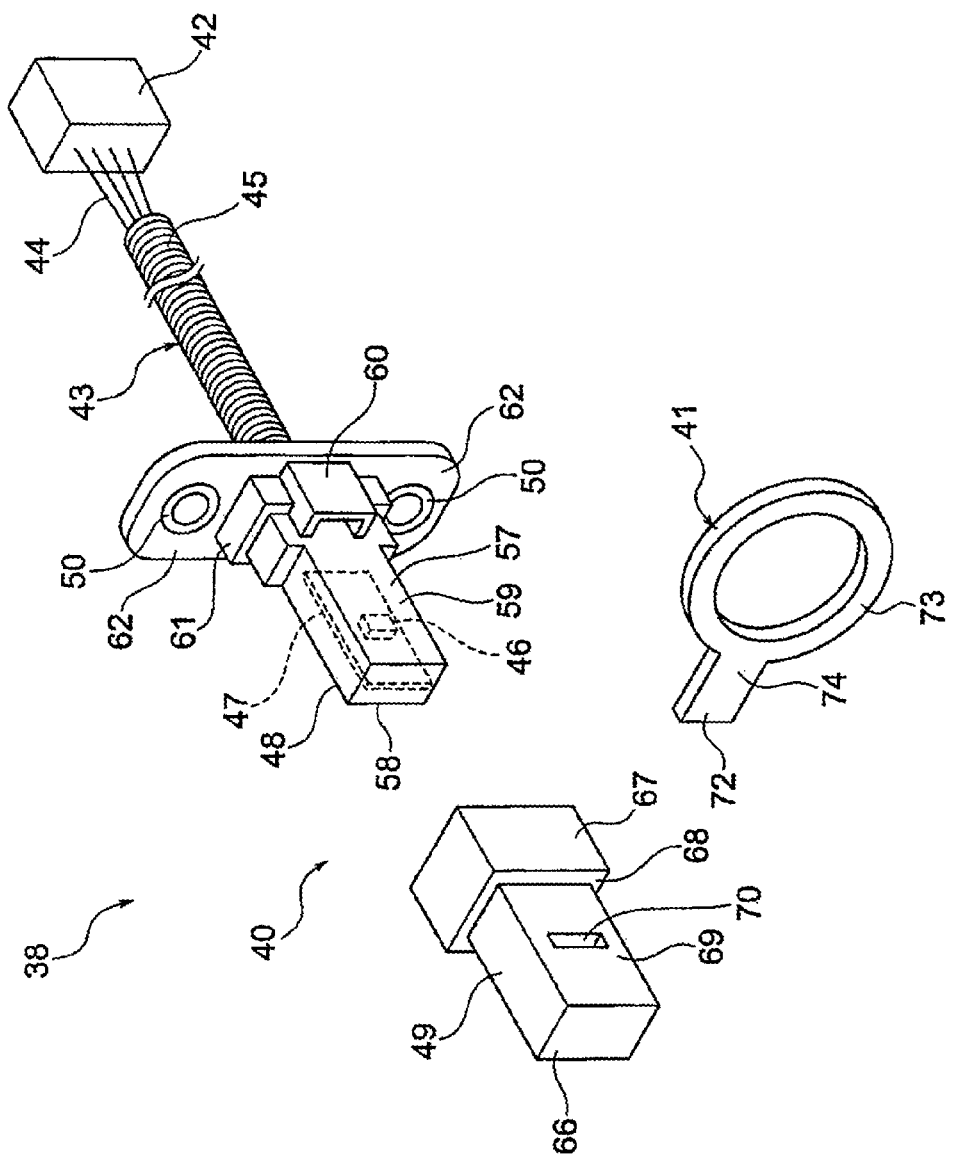
FIG. 4 is an exploded perspective view of the lighting unit.

An example will be described below, referring to FIGS. 2 to 4. FIG. 2 is an arrangement view of a power-receiving-side accommodating chamber showing the lighting structure of the charging connector related to the invention. Additionally, FIG. 3 is a cross-sectional view of chief portions of the lighting unit, and FIG. 4 is an exploded perspective view of the lighting unit.

In the following description, specific shapes, materials, numerical values, directions, and the like are merely examples for facilitating the understanding of the invention, and can be appropriately changed according to applications, purposes, and specification.

In order to drive a motor, a high-voltage battery is mounted on an electric automobile or a hybrid automobile. A charging connector is used for charging of this battery). (The charging connector in the following description is of either a direct-current type or an alternating-current type).

In FIG. 2, a charging connector 31 includes a power-supply-side connector 32 and a power-receiving-side connector 33 (vehicle-side inlet). The power-supply-side connector 32 and the power-receiving-side connector 33 have structures in which the connectors can be coupled or decoupled. The power-receiving-side connector 33 has a housing 34 and a cap 35. Such a power-receiving-side connector 33 is provided in a power-receiving-side accommodating chamber 36 arranged at a predetermined position of a vehicle. The lighting unit 38 related to the lighting structure of the invention other than the power-receiving-side connector 33 is further provided at a bottom wall 37 of the power-receiving-side accommodating chamber 36.

The lighting unit 38 is adapted to be turned on and off (this is an example), for example when an opening and closing lid (not shown) of the power-receiving-side accommodating chamber 36 is opened and closed or by a timer, or the like. The lighting unit 38 is provided in order to facilitate the coupling operation of the power-supply-side connector 32 and the power-receiving-side connector 33 at night or in a dark place. The power-receiving-side connector 33 and the lighting unit 38 are fastened and fixed to the bottom wall 37 of the power-receiving-side accommodating chamber 36 with bolts 39.

Well-known components are used as the power-supply-side connector 32 and the power-receiving-side connector 33, and the description of the connectors are omitted herein.

In FIGS. 2 to 4, the lighting unit 38 includes a lighting functional portion 40 and a light guide member 41, as portions exposed from the bottom wall 37 of the power-receiving-side accommodating chamber 36. Additionally, the lighting unit 38 includes a harness portion 43 connected to the lighting functional portion 40, a connector 42 provided at a terminal of the harness portion 43, and fixing means (for example, a well-known clip or the like (not shown)) for appropriately fixing the harness portion 43, as portions hidden by the bottom wall 37. Well-known components are used as the connector 42, the harness portion 43, and the fixing means (not shown). The harness portion 43 includes a plurality of electric wires 44 and a corrugated tube 45 that protects the plurality of electric wires 44.

The lighting functional portion 40 includes a light source 46 constituted by a plurality of types of LEDs with different emission colors, a timer board assembly 47 on which the light source 46 is mounted, a light-transmissive housing 48, a non-light transmissive cover 49 (protector), a collar 50, a holder 51, packing 52, a rubber plug 53, and a holder cover 54.

The timer board assembly 47 has a rectangular board. This board is provided with a predetermined circuit for causing the light source 46 to emit light, a timer circuit, and the like. Conductors of the electric wires 44 are electrically connected to connecting portions of the circuits by welding or the like.

The light source 46 is disposed in accordance with the height position of the charging port 41 in the housing 34, or the position of the light guide member 55. The light source 46 is adapted to be able to illuminate the position of the charging port 55 via the light guide member 41 by the light 56. In addition, since the light source 46 of the present example is constituted by a plurality of type of LEDs with different emission colors, the status of error, charging, or the like can be indicated by light emission at the position of the charging port 55.

The light-transmissive housing 48 is molded using a synthetic resin material having light permeability. The light-transmissive housing 48 is molded from resin so as to become transparent as a whole in the present example. Since the light-transmissive housing 48 is transparent as described above, the whole housing becomes a light-transmitting portion 57 that transmits light.

The light-transmissive housing 48 has a housing body portion 58, as a portion that accommodates and fixes the timer board assembly 47. Additionally, the light-transmissive housing 48 has swelling portions 60 and 61, at a side wall 59 of the housing body portion 58, as portions that swelling further outward than the side wall. Moreover, the light-transmissive housing 48 has a housing fixed portion 62 as a flanged portion that is continuous with the housing body portion 58 and the swelling portions 60 and 61.

The housing body portion 58 is formed in a tubular shape whose cross-section has a rectangular shape. The housing body portion 58 of such a shape has an upper wall 63 at the position of an upper end in the drawing, and has an opening 64 at the position of a lower end in the drawing. The opening 64 is arranged and formed so that the plane of this opening is located on the same plane as the lower surface of the housing fixed portion 62. The housing body portion 58 has a stepped portion 65 at a back position of the opening 64.

The stepped portion 65 is formed so as to function as a stopper that determines the insertion distance of the holder 51. A portion slightly above such a stepped portion 65 is formed so as to function as a sealing surface for the packing 52.

The housing fixed portion 62, which is a portion fixed to the bottom wall 37 of the power-receiving-side accommodating chamber 36 with bolts, is provided with a metallic collar 50.

The non-light transmissive cover 49 is molded using a synthetic resin material with no light permeability. The non-light transmissive cover 49 is formed in such a shape that the cover can detachably cover the light-transmissive housing 48. The non-light transmissive cover 49 has a first cover portion 66 that covers the side wall 59 and the upper wall 63 in the housing body portion 58 of the light-transmissive housing 48, a second cover portion 67 that covers the swelling portions 60 and 61 of the light-transmissive housing 48, and a cover stepped portion 68 that connects these portions.

A mounting portion 70 serving as a portion that inserts and mounts the light guide member 41 is formed in the side wall 69 of the first cover portion 66 so as to pass therethrough. The mounting portion 70 is arranged and formed in accordance with the position of the light source 46, or the height position of the charging port 55 of the housing 34.

The holder 51 is molded using a synthetic resin material having insulation properties. The holder 51 is adapted to be inserted into the housing body portion 58 of the light-transmissive housing 48, with the packing 52 provided on the outer peripheral surface thereof and with the plurality of electric wires 44 inserted therethrough.

The holder 51 has electric wires insertion chambers 71 equivalent to the number of the electric wires 44. The electric wires insertion chambers 71 is formed so as to able to watertightly accommodate the electric wires 44 in a state where the rubber plug 57 is attached.

The holder cover 54 is molded using a synthetic resin material having insulation properties. The holder cover 54 is formed so as to fit to the opening 64 of the housing body portion 58. The holder cover 54 is formed so as to be able to prevent coming-off of the holder 51.

The electric wires 44 are held by the holder 51 and the holder cover 54 in a state where the wires are curved in a crank shape as illustrated. In addition, the reason why the electric wires are curved and held as in the present example is because an external force is not allowed to act on the connecting portions of the electric wires 44 to the timer board assembly 47 even if an external force in a pulling-out direction is applied to the electric wires 44.

The light guide member 41 is molded using a synthetic resin material having light permeability. The light guide member 41 is molded from resin so as to become transparent as a whole in the present example. Since the light guide member 41 is transparent as described above, the whole light guide member becomes a member that enables guide of light as a while.

The light guide member 41 has a light incidence portion 72, a light-emitting portion 73, and an intermediate portion 74 that connects the light incidence portion 72 and the light-emitting portion 73 together. The light incidence portion 72 is formed as a portion that is inserted into the mounting portion 70 and brought into a mounting state. Additionally, the light incidence portion 72 is formed as a portion that is continuous with the side wall 59 of the housing body portion 58. The light-emitting portion 73 is formed as an annular portion provided at the charging port 55 of the housing 34 in the power-receiving-side connector 33.

The light guide member 41 is formed so as to be able to guide the light 56 from the light source 46 to the light-emitting portion 73 via the light incidence portion 72 and the intermediate portion 74. The light guide member 41 is formed substantially in the shape of a magnifying glass in plan view.

If the light-emitting portion 73 emits light with the guided light 56, the light-emitting portion can be caused to look like shining the charging port 55 of the housing 34. Since the light-emitting portion 73 shines annularly, the time and efforts taken to search for the charging port 55 are eliminated, and anyone can simply perform the coupling operation of the power-supply-side connector 32 and the power-receiving-side connector 33 at night or in a dark place.

The light-emitting portion 73 is provided with a light storage functional portion 75. The light storage functional portion 75 is provided as a portion that can cause the light-emitting portion 73 to continue shining, even in a case where the light 56 from the light source 46 is interrupted by, for example, a timer function or the like.

As described above referring to FIGS. 2 to 4, in the lighting structure of the charging connector 31 related to the present example, the light-emitting portion 73 of the light guide member 41 can be caused to emit light so as to look like shining the charging port 55 of the housing 34. Therefore, an effect is exhibited that an operator can be caused to visually recognize the position of the charging port 55 easily and reliably. Accordingly, an effect is exhibited that anyone can simply perform the coupling operation of the charging connector 31.

Additionally, according to the lighting structure of the above charging connector 31, since the light source 46 is constituted by a plurality of types of LEDs with different emission colors, an effect is exhibited that the status of, for example, error, charging in progress, or charging completion can be indicated by light emission (can also be indicated by simple color or RGB light emission or indicated by flashing or blinking) in addition to the light emission in the coupling operation.

This disclosure of Japanese Patent Application No. 2011-039248 filed on Feb. 25, 2011, including specification, drawings and claims in incorporated herein by reference in its entirety.

In addition, it is natural that the invention can be changed in various ways without departing the main purport of the invention.

What is claimed is:

1. A lighting structure of a charging connector, comprising:
a light source positioned at a lighting function portion; and
a light guide member that guides light from the light source, and is positioned between the lighting function portion and a power-receiving-side connector, the light guide member also including a light emitting portion,
wherein the light-emitting portion of the light guide member is provided at a charging port of a housing of the power-receiving-side connector of a charging connector including a power-supply-side connector and the power-receiving-side connector,
wherein the light-emitting portion is provided with a light storage functional portion configured to continue shining light when the light source stops shining light.

2. The lighting structure of a charging connector according to claim 1, wherein a light-transmissive housing is provided to cover the light source, and the light guide member is formed integrally with the light-transmissive housing.

3. The lighting structure of a charging connector according to claim 1, further comprising a plurality of types of the light sources with different emission colors.

* * * * *